3,584,070
SKELETAL ISOMERIZATION OF OLEFINS
Robert B. Regier, Bartlesville, Okla., assignor to
Phillips Petroleum Company
No Drawing. Filed Jan. 22, 1970, Ser. No. 5,102
Int. Cl. C07c 5/22; B01j 11/76
U.S. Cl. 260—683.2                                9 Claims

ABSTRACT OF THE DISCLOSURE

Olefins are skeletally isomerized by contact with a catalyst comprising a composite containing alumina associated with thorium oxide and/or cupric oxide which is subjected to fluoride treatment.

BACKGROUND OF THE INVENTION

Field of the invention

This invention relates to catalytic skeletal isomerization of olefins.

Description of the prior art

The conversion of linear or relatively unbranched olefinic molecules to branched or more highly branched olefinic molecules has long been an important process. A number of catalysts have been utilized for such conversion, generally at high temperature, and these have been used with varying success. See, for example, U.S. 3,217,057, Moore et al., issued Nov. 9, 1965. While a number of materials have been found which catalyze this conversion, the drastic conditions which are generally required also result in a number of byproducts, both heavier and lighter than the starting feed material, which seriously affect the efficiency of the process. Thus, a highly desirable catalytic process for skeletally isomerizing olefins is one which will provide a high degree of selectivity while still retaining the ability to convert a larger percentage of the feed olefin per pass.

OBJECTS OF THE INVENTION

It is an object of this invention to skeletally isomerize olefins with minimum concurrent production of heavier and lighter materials than the feed olefin. It is a further object of the invention to selectively skeletally isomerize olefins at high conversions per pass over the catalyst. Other objects and advantages of the present invention will be apparent upon readily the detailed description of the invention, the example, and the claims.

SUMMARY OF THE INVENTION

I have discovered that olefins can be skeletally isomerized by contact with a fluorided catalyst composite comprising alumina promoted by $ThO_2$ and/or $CuO$.

DETAILED DESCRIPTION OF THE INVENTION

The presence of the $ThO_2$ and/or $CuO$ in the catalyst composite of the invention increases the skeletal isomerization selectivity when compared with fluoride alumina alone. The alumina-containing composite of the present invention is one which contains a major amount by weight of alumina and a minor amount by weight of thorium oxide and/or cupric oxide. Other materials which do not adversely effect the catalyst activity and selectivity can be present in the catalyst composition as long as the alumina component comprises at least 50% by weight of the composite. Preferably, the composite contains from about 5 to about 25 weight percent of $ThO_2$ and/or $CuO$ promoter material. Such catalystic compositions are known in the art and generally commercially available. They can be prepared by any suitable means such as by coprecipitation, impregnation, or dry mixing.

The catalyst composite requires relatively little preactivation before the fluoriding treatment. Because steam is evolved in the fluoriding treatment, it is unnecessary to go to great lengths to dry the catalyst composite prior to the fluoriding. Thus, preliminary drying of the composite at temperatures of up to about 200° C. or higher, if desired, is sufficient.

The fluoriding of the above-described composite can be carried out either in liquid phase or in vapor phase at a temperature of at least about 100° C. In a liquid phase treatment, a suitable procedure is to heat the composite with an aqueous solution of either hydrofluoric acid or ammonium fluoride for a time which is sufficient to add a substantial amount of fluoride to the composite and to improve the catalytic effectiveness of the composite. In vapor phase fluoriding, which is the preferred method, a suitable procedure is to contact a bed of the composite with hydrogen fluoride at a bed temperature of at least 100° C. but not exceeding about 400° C. Steam will be evolved throughout the fluoriding operation and the fluoriding will be considered complete when, at a given set of fluoriding conditions, copious amounts of hydrogen fluoride are observed leaving the bed. It has been found that the extent of fluoriding will depend upon the temperature of the catalyst bed. Thus, even after hydrogen fluoride is observed to be passing through the bed without further reaction at a specific bed temperature, additional fluorine can be added by allowing a further increase in the bed temperature.

The fluoriding operation is highly exothermic and, for purposes of controlling the temperature, the hydrogen fluoride preferably should be diluted with an inert gas such as nitrogen, or a noble gas such as argon and the like. The hydrogen fluoride can be a minor portion of the treating gas but should comprise at least about one volume percent of that gas. After the fluoriding treatment, the treated catalyst composite should be flushed with an inert gas to remove unreacted hydrogen fluoride or any other volatile materials. The flushing should take place at a temperature which is at least the temperature of the subsequent conversion reaction and can conveniently be as high as about 550° C. or higher.

The olefins to which the invention is applicable are those olefinic compounds which can undergo skeletal isomerization. Preferably, skeletally isomerizable olefins which have from 5 to about 12 carbon atoms per molecule are employed. Monoolefin hydrocarbons are more preferred and these can be terminal or internal, and branched or unbranched. However, it is preferred that branching, if present, be at least one carbon atom removed from the double bond. Suitable olefins include pentene-1, pentene-2, hexene-3, 4-methyloctene-1, decene-2, 3-methyldecene-1, 3-dodecene, and the like, and mixtures thereof. The invention also contemplates the skeletal isomerization of olefin-containing streams such as those found in the production of distillation fuels, e.g., gasoline.

According to the process of the invention, the feed olefins are skeletally isomerized by contact with the above-described catalyst system at a temperature in the range of from about 300 to about 600° C., preferably about 310° to about 525° C., and at any convenient pressure in the range of the from about 0 to about 2000 p.s.i.g., relatively low pressures being preferable. Any suitable type of contacting technique can be used, a continuous process using a fixed catalyst bed being particularly convenient. Using such a fixed bed operation, the feed will be admitted at a weight hourly space velocity in the range of from about 0.1 to about 10, preferably 0.5–5. After conversion, the product can be separated and/or isolated from the reaction mixture by any suitable means. Unconverted feed material can be recycled to the reaction zone.

The invention is illustrated by the following example. However, it is understood that the data of the example is provided for the purpose of illustration and should not be construed as limiting the scope of the invention as above described.

Example

The process of the present invention was demonstrated in a number of runs in which pentene-2 was skeletally isomerized in a fixed bed continuous reaction over several catalysts and at different temperatures. Each run was carried out at atmospheric pressure and at a weight hourly space velocity of 2–3.

Each of the catalysts used was a commercially available catalytic grade composition in the form of 1/8 inch pellets. Before undergoing the fluoriding treatment, each catalyst composition was dried at about 200° C. Following the drying, a fixed bed of the catalyst was treated with a flowing equimolar mixture of nitrogen and hydrogen fluoride gas at a rate such that the maximum temperature of the bed did not exceed about 200° C. The treatment was continued in each case until copious amounts of HF were observed at the exit of the catalyst bed. The flow of HF was then cut off and the bed was flushed with nitrogen while the bed temperature was elevated to about 500° C.

Ten ml. of each treated catalyst was then charged as a fixed bed into a glass tubular reactor through which the pentene-2 was passed under reaction conditions. The reactor effluent was passed into a 0° C. condenser and collected. Only a negligible amount of gas was not recovered by the condenser.

The reactor effluent from about 50 minutes of operation was obtained for each run. This was then analyzed by gas-liquid chromatography. The catalyst beds were regenerated by a passage of flowing air at a bed temperature of about 500° C. until any carbon present in the bed had been burned off.

In one run, a regenerated fluorided $90Al_2O_3$—$10ThO_2$ was used to convert pentene-2 at a reactor temperature of about 513° C. The reactor effluent, excluding negligible amounts of light and heavy ends, was analyzed and found to consist of:

| | Weight percent |
|---|---|
| $C_3$ | 0.2 |
| $C_4$ | 1.0 |
| $C_5$ | 97.7 |
| $C_6$ | 1.1 |

The $C_5$ components were further analyzed and were found to consist of:

| | |
|---|---|
| Isopentane | 0.7 |
| 3-methylbutene-1 | 2.2 |
| n-Pentane | 0.3 |
| 1-pentene | 9.7 |
| 2-methylbutene-1 | 13.7 |
| Trans-pentene-2 | 28.4 |
| Cis-pentene-2 | 15.9 |
| 2-methylbutene-2 | 29.0 |

Thus, the conversion of pentene-2 in the run was 47.1% and the selectivity to isopentenes was 93.0%.

The essential data from this run and other runs with other catalysts, including several comparison runs with fluorided alumina, are shown in the table below.

TABLE.—SKELETAL ISOMERIZATION OF PENTENE-2

| | Fluorided $Al_2O_3$ catalyst | | | | | | | | Fluorided $90$-$Al_2O_3/10$-$ThO_2$ catalyst | | | | | | Fluorided $90$-$Al_2O_3/10$-$CUO$ catalyst | | | | | |
|---|---|---|---|---|---|---|---|---|---|---|---|---|---|---|---|---|---|---|---|---|
| | Fresh | | | Regenerated | | | | | Fresh | | | Regenerated | | | Fresh | | | Regenerated | | |
| Run No. | 1 | 2 | 3 | 4 | 5 | 6 | 7 | 8 | 9 | 10 | 11 | 12 | 13 | 14 | 15 | 16 | 17 | 18 | 19 | 20 |
| Temperature, °C | 316 | 346 | 391 | 312 | 342 | 284 | 423 | 454 | 365 | 413 | 462 | 511 | 415 | 513 | 313 | 365 | 414 | 359 | 408 | 460 |
| Conversion, percent | 26.8 | 35.5 | 48.1 | 25.6 | 31.7 | 45.3 | 56.6 | 60.6 | 23.5 | 35.0 | 44.0 | 46.5 | 34.0 | 47.1 | 22.1 | 38.5 | 55.0 | 27.7 | 47.9 | 61.6 |
| Selectivity, percent | 81.4 | 83.2 | 80.9 | 80.5 | 84.3 | 82.0 | 81.8 | 80.5 | 92.4 | 92.6 | 92.3 | 92.2 | 92.4 | 93.0 | 92.7 | 90.5 | 87.3 | 93.5 | 90.6 | 84.6 |

These data illustrate the improvement obtained by using, as a skeletal isomerization catalyst, a fluorided alumina which has been promoted with minor amounts of CuO or $ThO_2$ prior to the fluoriding treatment. It is readily seen that the invention process results in much higher selectivities over a broad range of conversion levels than the process using fluorided but unpromoted alumina.

Reasonable variation and modifications of my invention are possible without departing from the spirit and scope thereof.

I claim:

1. A process of skeletal isomerization of olefins which comprises contacting a feed olefin with a catalyst comprising a fluorided composite of at least 50 weight percent alumina promoted by an oxide selected from the group consisting of copper and thorium.

2. A process according to claim 1 wherein the catalyst contains from about 5 to about 25 weight percent of cupric oxide or thorium oxide.

3. A process according to claim 1 wherein the feed olefin is contacted with said catalyst at a temperature in the range of from about 300° C. to about 600° C.

4. A process according to claim 3 wherein the feed olefin has 5 to 12 carbon atoms per molecule and is capable of being skeletally isomerized.

5. A process according to claim 4 wherein the feed olefin is a terminal or internal, branched or unbranched monoolefin hydrocarbon.

6. A process according to claim 1 wherein the alumina promoted by an oxide of copper or thorium has been fluorided with an aqueous solution of hydrofluoric acid or ammonium fluoride at a temperature of at least about 100° C.

7. A process according to claim 1 wherein the alumina promoted by an oxide of copper or thorium has been fluorided with gaseous hydrogen fluoride in the presence of an inert gas diluent at a temperature of at least about 100° C.

8. A process according to claim 5 wherein the monoolefin is pentene-2.

9. A catalyst consisting essentially of at least 50 weight percent alumina promoted by from about 5 to about 25 weight percent of an oxide selected from the group consisting of copper and thorium which has been subjected to treatment with hydrogen fluoride.

(References on following page)

References Cited

UNITED STATES PATENTS

| | | | |
|---|---|---|---|
| 2,900,429 | 8/1959 | Heinnemann et al. | 260—683.2 |
| 2,352,416 | 6/1944 | Thomas et al. | 260—683.2 |
| 2,349,812 | 5/1944 | Day et al. | 260—683.2 |
| 2,326,703 | 8/1943 | Thiele et al. | 260—683.2 |
| 2,471,647 | 5/1949 | Oblad et al. | 260—683.2 |
| 3,217,057 | 11/1965 | Moore et al. | 260—683.2 |
| 3,294,852 | 12/1966 | Vecchio et al. | 252—442 |
| 3,413,360 | 11/1968 | Gardner | 252—442 |
| 3,426,089 | 2/1969 | DeRosset | 252—442 |
| 3,432,562 | 3/1969 | Gardner | 252—442 |
| 3,505,417 | 4/1970 | Gardner | 252—442 |
| 3,457,189 | 7/1969 | De Rosset | 252—442 |
| 3,514,253 | 5/1970 | Robota | 252—442 |

DELBERT E. GANTZ, Primary Examiner

V. O'KEEFE, Assistant Examiner

U.S. Cl. X.R.

252—442